United States Patent Office 3,460,622
Patented Aug. 12, 1969

3,460,622
METHOD OF INCREASING INJECTIVITY OF FLUIDS INTO FORMATIONS
John A. Davis, Jr., Littleton, Colo., assignor to Marathon Oil Company, Findlay, Ohio, a corporation of Ohio
No Drawing. Filed Apr. 20, 1967, Ser. No. 632,201
Int. Cl. E21b 43/22, 43/26
U.S. Cl. 166—271          10 Claims

ABSTRACT OF THE DISCLOSURE

The present invention relates to the recovery of fluids from subterranean formations by injecting into the formation, first a slug of miscible-type material, second, displacing the first slug with a drive fluid, then fracturing the subterranean formation by injecting a fracturing fluid under pressure while controlling the fracture so that it does not extend substantially into the slug of soluble oil and thereafter injecting a second amount of the drive fluid to displace hydrocarbons.

---

This invention relates to an improved petroleum recovery process, and more particularly, to a miscible recovery process wherein the reservoir is subject to a light fracture treatment subsequent to injection of miscible flooding material.

Many processes for treating petroleum reservoirs with viscous fluids are known. These processes disclose that the treatment of a reservoir with a fluid having a viscosity approaching that of the crude oil in place will generally permit displacement of substantially more oil than other treatments. One difficulty frequently encountered in viscous fluid treating operation, however, is that of low injectivity. The rate at which the fluid can be forced into a porous medium varies inversely with viscosity and hence an increase in fluid viscosity to obtain greater oil recovery is accompanied by a decrease in the rate at which the solution can be injected into the reservoir under a given pressure gradient. Consequently, it would require much greater pressures or greatly increased treating times in order to overcome the low injectivity of high viscosity fluids.

One method for increasing the injectivity of viscous solutions in petroleum reservoirs is described in U.S. Patent 3,208,518. This patent teaches that many polymer solutions have low viscosities at low (less than 6) or high (greater than 9) pH, and subsequent to injection their pH slowly changes to that of the reservoir (6–9) with a corresponding increase in viscosity. Thus, the point of the patent is to increase injectivity by injecting thickened water with a low viscosity to push the fluid away from the well bore, and then have the solution increase as the pH of the injected fluid changes.

This technique would have definite drawbacks if used in connection with a miscible flooding process such as the Maraflood flooding process (Oil and Gas Journal, Sept. 12, 1966, page 78). To adequately protect the rear interface of the soluble oil slug, a bank of polymer solution would have to be injected before injecting a low viscosity polymer solution. Failure to do this could lead to (1) a rapid deterioration of the rear end of the slug because of adverse mobility ratios, or (2) if the pH of the polymer solution increases rapidly enough to protect the slug, then the benefits of low viscosity would be lost.

In a miscible, hereinafter referred to as soluble oil, flood where a critically sized and expensive slug material must be protected, the rate of viscosity change would be quite important. For a soluble oil flood to operate most efficiently, we must maintain control of mobility ratios between soluble oil slug and reservoir fluids; soluble oil slug and polymer solution; miscibility of soluble oil slug and oil; ease of emulsification of soluble oil slug and polymer slug; soluble oil stability; and adsorption of slug components and polymer. To add pH control to this list would be an additional and unnecessary complication.

The present invention increases injectivity of polymer solutions or other viscous driving fluids without resorting to complicated pH control. The invention is especially valuable when soluble oils readily emulsifiable with water, are to be driven by aqueous drive fluids.

The advantages of the present invention are obtained by injecting a soluble oil, injecting a drive fluid, subjecting the reservoir to a light fracture treatment, injecting additional drive fluid, and finally, applying a driving means to recover the oil from the reservoir.

The drive fluids may be a single fluid, e.g., water, water thickened with polymers such as polyacrylamide, gases such as methane or ethane, various liquid hydrocarbons, etc. Alternatively, a series of slugs of different drive fluids can be employed.

The soluble oils utilized in the present invention may be any of the known types in the prior art. For example, the water-containing soluble oils of U.S. Patent 3,254,714; the non-aqueous soluble oils of U.S. Patent 3,163,214; and also emulsions as described in U.S. Patent 3,261,399. Briefly, in effect the present invention can be utilized in any type of flooding process where a bank of expensive material or soluble oil is to be protected by injecting a driving fluid. Injectivity is increased by the step of fracturing in the present invention. It is especially preferred that the soluble oil have the ability to spontaneously emulsify with water.

Subsequent to the injection of an expensive slug material or soluble oil, a bank of a thickened solution is injected. In general, a thickened solution is a solution of water and a viscosity increasing additive. For example, aqueous solutions of sugars, dextrans, carboxymethylcellulose, amines, polymers, glycerin, alcohols, and mixtures of these agents are suitable. Thickened hydrocarbon slugs may also be used, such as, polyisobutylene or rubber benzene and oil-external emulsions. The bank of thickened solution is injected until the soluble oil-thickened solution interface has moved from about 2 to 75 feet from the well bore and preferably between 5 and 50 feet.

Fracturing without propping is also within the scope of the present invention though in general, it is preferable that the formation be propped open. Any of the fracturing methods known in the prior art are suitable to accomplish this aspect of the present invention, utilizing known fracturing fluids and propping agents. However, if desired, the thickened solution can be used as a fracturing fluid. That is, after a sufficient quantity of thickened solution has been injected, another quantity may be injected at fracturing pressures and rates. Propping material can be included in the fracturing quantity of thickened solution. Fracturing should be done after a bank of thickened solution has been injected. If the reservoir is fractured at the end of soluble oil injection preceding thickened solution injection, then a quantity of expensive soluble oil would be bypassed by the thickened solution. While most of the soluble oil would eventually be moved as more and more thickened solution is injected it would no longer be in a position to effectively displace oil. When the well is fractured before all the thickened solution has been injected, some thickened solution may be bypassed when water is injected thereafter as a drive fluid. Since the cost of thickened solution is much less than that of the soluble oil, this is not an important consideration when considering the time that is saved in the life of a project due to increased injection rates. Preferably, the fracturing is so controlled as not to cause the fracture to extend into the soluble oil in the reservoir.

Water is the preferable drive material, although gas drives can be substituted therefor, especially, hydrocarbon gas drives.

The following example more fully illustrates my invention, but it is not intended that my invention be limited to the particular materials described, etc. Rather, it is intended that all equivalents obvious to those skilled in the art be included within the scope of my invention as claimed.

Example I

The present invention is employed to produce a petroleum bearing reservoir having about 35% of the initial in place crude oil remaining. The reservoir is located at a depth of 1000 feet and is 20 feet thick. The permeability of the sand is 300 md., and the porosity is 20%. A slug of soluble oil comprising by volume 25% water, 60.2% kerosene, 2.5% isopropyl alcohol, and 12.3% alkylarylnaphthenic monosulfonate is injected into the formation in a quantity of 7% of the pore volume. Thereafter, a second solution consisting of 0.12% by weight of polyacrylamide having a molecular weight in the range of 1–10,000,000 is injected. The quantity of thickened material injected is in sufficient quantity to move the soluble oil at least 30 feet from the well bore, and preferably 50 feet. A second quantity, 4000 gallons, of thickened solution of identical composition containing 10,000 pounds of sand is injected at a pumping pressure of about 1200 p.s.i.g. at a rate of 15 barrels per minute until a large drop in pumping pressure is noted. After fracturing, normal water injection is conducted at a pressure of 700 p.s.i.g. The new intake capacity of the well is found to be 250 barrels per day. Petroleum oil is recovered from output wells in a conventional manner.

It should be understood that the above example is merely illustrative and that a wide variety of compositions and techniques may be employed with the invention. For example, the soluble oil may contain from about 15 to about 75% by weight of water, from 20 to about 80% of $C_3$ to $C_{20}$ hydrocarbons, from 0 to 10% $C_1$ to $C_{10}$ alcohols, and from about 1 to 15% alkylenearylnaphthalenicmonosulfonnates. Alternatively, the soluble oils may contain other ingredients so long as the final compositions are all within the range normally termed "soluble oils" by those skilled in the art. While a wide variety of drive fluids may be utilized, the most preferred for the purposes of the present invention, will be water, preferably thickened with from about 0.01 to about 1.0% polyacrylamide.

What is claimed is:

1. The process of recovering petroleum fluids from a subterranean formation having at least one injection well and at least one production well therein comprising:
   (a) injecting at least one slug of a soluble oil into said formation through an injection well;
   (b) displacing said slug of soluble oil by injecting drive fluid into said formation through said injection well;
   (c) fracturing said subterranean formation by injecting fracturing fluid into at least one of said injection wells at a sufficient pressure and rate to cause fracturing, said fracturing being controlled so the fracture does not extend substantially into said slug of soluble oil;
   (d) injecting a second amount of a drive fluid into said subterranean formation to displace hydrocarbons through at least one of said injection wells used for fracturing toward a production well; and
   (e) recovering oil from said subterranean formation through said production well.

2. The process of claim 1 wherein said drive fluid is about 0.01 to 1.0% by weight polyacrylamide dissolved in water.

3. The process of claim 2 wherein the soluble oil is comprised of by volume from about 15 to 75% water; 20 to 80% $C_3$ to $C_{20}$ hydrocarbons; 0 to 10% $C_1$ to $C_{10}$ alcohols and 1 to 15% alkylarylnaphthenic monosulfonate.

4. The process of claim 2 wherein the soluble oil has the ability to spontaneously emulsify with water.

5. The process of claim 2 wherein the soluble oil is an oil-external microemulsion.

6. The process of recovering petroleum fluids from a subterranean formation having at least one injection well and at least one production well therein comprising:
   (a) injecting a slug of microemulsion through an injection well into said formation;
   (b) displacing said slug by injection of a quantity of drive fluid through said injection well into said formation;
   (c) fracturing said subterranean formation by injecting a quantity of drive fluid through at least one of said injection wells at fracturing pressures and injection rates, while controlling said quantity, pressure, and rate so that said fracturing does not extend into said slug of microemulsion;
   (d) injecting a second quantity of a drive fluid through at least one of said injection wells used for fracturing into said subterranean formation to displace hydrocarbons toward a production well; and
   (e) recovering oil from said formation through said production well.

7. The process of claim 6 wherein one of said drive fluids is from about 0.01 to about 1.0% by weight polyacrylamide dissolved in water.

8. The process of claim 7 wherein the microemulsion is comprised of by volume from about 15 to 75% water, 20 to 80% $C_3$ to $C_{20}$ hydrocarbons, 0 to 10% $C_1$ to $C_{10}$ alcohols, and 1 to 15% alkylarylnaphthenic monosulfonate.

9. The process of claim 7 wherein the microemulsion has the ability to spontaneously emulsify with water.

10. The process of claim 7 wherein microemulsion is a soluble oil.

References Cited

UNITED STATES PATENTS

| | | | |
|---|---|---|---|
| 3,163,212 | 12/1964 | Bernard | 166—9 |
| 3,254,714 | 6/1966 | Gogarty et al. | 166—9 |
| 3,261,399 | 7/1966 | Coppel | 166—9 |
| 3,266,570 | 8/1966 | Gogarty | 166—9 |
| 3,324,944 | 6/1967 | Poettmann | 166—9 |

CHARLES E. O'CONNELL, Primary Examiner

IAN A. CALVERT, Assistant Examiner

U.S. Cl. X.R.

166—263, 273, 275, 308